United States Patent [19]

Langner

[11] Patent Number: 5,178,896
[45] Date of Patent: Jan. 12, 1993

[54] FIBER BEVERAGE AND METHOD OF MANUFACTURE

[76] Inventor: Bruce J. Langner, 1540 Ocean Ave., Unit 11, Sea Bright, N.J. 07760

[21] Appl. No.: 850,005

[22] Filed: Mar. 10, 1992

Related U.S. Application Data

[63] Continuation-in-part of Ser. No. 735,083, Jul. 24, 1991, abandoned, which is a continuation-in-part of Ser. No. 722,878, Jun. 28, 1991, abandoned.

[51] Int. Cl.$^5$ .............................................. A23L 2/38
[52] U.S. Cl. ..................................... 426/590; 426/573; 426/804
[58] Field of Search ............... 426/590, 578, 804, 573, 426/658

[56] References Cited

U.S. PATENT DOCUMENTS

| | | | |
|---|---|---|---|
| 3,294,552 | 12/1966 | Topalian | 426/658 |
| 3,615,701 | 10/1971 | Goss | 426/658 |
| 3,897,571 | 7/1975 | Homler | 426/590 |
| 4,078,092 | 3/1978 | Nishiyama | 426/590 |
| 4,143,163 | 3/1979 | Hutchison | 426/96 |
| 4,159,210 | 6/1979 | Chen | 426/658 |
| 4,264,638 | 4/1981 | Sirett | 426/590 |
| 4,311,717 | 1/1982 | McGinley | 426/590 |
| 4,459,315 | 7/1984 | Salo | 426/590 |
| 4,528,205 | 7/1985 | Turrisi | 426/658 |
| 4,680,189 | 7/1987 | Schumacher | 426/285 |
| 4,684,532 | 8/1987 | Izzo | 426/804 |
| 4,684,532 | 8/1987 | Izzo | 426/804 |
| 4,710,390 | 12/1987 | Schumacher | 426/285 |
| 4,786,521 | 11/1988 | Bennett | 426/658 |
| 4,915,970 | 4/1990 | Coffey | 426/578 |
| 4,927,649 | 5/1990 | Antenucci | 426/273 |
| 4,938,989 | 7/1990 | Steeves | 426/658 |

FOREIGN PATENT DOCUMENTS 8800591  9/1988  PCT Int'l Appl. ................ 426/878

OTHER PUBLICATIONS

Whistler 1959 Industrial Gums Academic Press New York pp. 565-594.
Methocel Product Information 1974 The Dow Chemical Co.
The Bulletin-Amer. Soc. of Hosp. Phar, Mar/Apr. 1950, pp. 68-69 "Sodium Carboxymethylcellose," paragraph.
Methocel "Intro. Thermal Gelling Methocel" . . . Food Ind., 1974, T. A. Lindsay-The Dow Chem. Co., Jan. 1990.
"Preparations", by E. Bactowsky et al; *American Society of Hosp. Phar.*, Mar./Apr. 1950, pp. 65-73.
"A Psychobiologic Appr. . . . Obesity", by A. D. Jonas, M.D., *American Prac.*, Sep. 1950 pp. 933-937.
"Industrial Gums", by Roy L. Whistler et al., Academic Press, New York & London 1959, pp. 565-594.
"Methylcellulose and its Derivatives", 1973 Ed pp. 623-647 by G. K. Greminger et al.
"56:12 Carthartics and Laxatives", pp. 1620-1622.
"Clinical Eval. of Meth. as a Bulk Lax." by J. W. Hamilton et al, Digestive Diseases and Science, vol. 33, No. 8 (Aug. 1988).
"Metolose" by Shin-Etsu Chemical Co., Ltd. chart (p. 16).
"Pharmaz. Tech." by M. von A. Heinemann (German) w/Eng translation as it pertains to fiber . . . methyl.
Fiber Definitions/Description pp. 4-27 Literature.
Dow product literature for "Methocel Cellose Ethers", Technnical Handbook, (Apr. 1988) pp. 12-17, 27-38, Apr. 1988.
"Sugar-free and Non-Glycogentic Prep. for Use by Diabetic Persons", by Chrales W. Bauer et al, pp. 296-301 based on thesis to Grad. Council of Mass. Collg. in San Fran., Calif. on Aug. 1948.
"Cellulose Derivatives" by M. A. Lesser, *Drug and Cosmetic Ind.*, May 1948: 62,5 pp. 612-832.

*Primary Examiner*—Carolyn Paden
*Attorney, Agent, or Firm*—Ratner & Prestia

[57] ABSTRACT

A dietary fiber supplement in beverage and liquid concentrate liquid dosage forms wherein the dietary fiber source is 400 grade methylcellulose. A method of making the dietary fiber supplement is also disclosed.

15 Claims, No Drawings

FIBER BEVERAGE AND METHOD OF MANUFACTURE

This is a continuation-in-part of U.S. patent application Ser. No. 07/735,083, filed Jul. 24, 1991, now abandoned, which is a continuation-in-part of U.S. patent application Ser. No. 07/722,878 filed Jun. 28, 1991, now abandoned, of common inventorship herewith.

FIELD OF THE INVENTION

This application generally relates to dietary fiber, in particular to a fiber beverage and a method of making a fiber beverage.

BACKGROUND OF THE INVENTION

Dietary fiber is a term for a variety of plant substances that are resistant to digestion by human gastrointestinal enzymes. Dietary fiber supplements contain naturally occurring plant fiber such as psyllium, semi-synthetic fiber such as methylcellulose or synthetic fiber such as calcium polycarbophil.

Dietary fibers can be divided into two groups, based on their water solubility. The structural or matrix fibers, cellulose for example, are insoluble. The natural fibers, pectins for example, are soluble.

The addition of fiber to the human diet has attracted increasing interest in recent years as the shortcomings of the diets of western countries have become known. The current prevalence of diseases including diabetes, coronary heart disease, colorectal cancer and gastrointestinal disorders such as constipation, hemorrhoids and diverticular disease, are associated with, among other things, diets containing more fat and less fiber.

It has been suggested that increasing dietary fiber intake may help prevent many diet-related disorders and/or mitigate their course. The American Diabetes Association and National Cancer Institute recommend diets high in fiber and complex carbohydrates and low in fat. Physicians and pharmaceutical companies have attempted to correct the deficiency of dietary fiber with products that struggle to achieve this purpose.

Because Westernized diets are made up of so many highly processed, low-fiber foods, it takes a concerted effort to begin a high-fiber dietary habit. However, it must be remembered that it is extremely difficult for most people to make major changes in eating habits. Therefore, the use of dietary fiber supplements is becoming more widespread.

Currently available fiber supplements include Metamucil®, which contains psyllium as the active ingredient; Citrucel®—a methylcellulose composition supplied in powder form; Fibercon®, which contains calcium polycarbophil as the fiber source.

U.S. Pat. No. 4,988,530—Hoersten et al—is drawn to a beverage containing pectin having a degree of esterification of at least 50%. Hoersten et al discloses the two groups of dietary fiber, insoluble fiber and soluble fiber, and identifies the problems associated with using each group as a fiber source in food products. When incorporated into liquid food formulations, the insoluble dietary fibers are difficult to maintain in proper suspension or dispersion and tend to settle to the bottom of drinks and beverages. Additionally, the insoluble dietary fibers provide the liquid foodstuffs with a gritty texture and are not particularly pleasant tasting.

Because of their solubility, the soluble dietary fibers do not have a gritty texture associated with their use. The soluble fibers, however, tend to thicken liquid products and can affect the original sensory mouthfeel of the unmodified liquid. The Hoerstern et al patent also recognizes the obstacles in the use of carboxymethylcellulose as a liquid dietary supplement. The addition of carboxymethylcellulose to water or juice was thought to require prompt consumption or the solution would result in thickening to the consistency of partially set gelatin or wallpaper paste.

Additional related art includes U.S. Pat. No. 3,455,714 which discloses cellulose derivatives with a water soluble cellulose ether coating to improve the dissolution of insoluble cellulose fibers in water, however, a beverage or liquid form of the water-soluble composition is not disclosed; and U.S. Pat. No. 4,321,263 discloses coating psyllium with a polyethylene glycol-polyvinyl pyrrolidone composition also to improve dispersability of psyllium in water.

Accordingly, there exists a need for a dietary fiber supplement available in a liquid dosage form, containing methylcellulose, thus making the addition of fiber to one's diet pleasant tasting and effective.

BRIEF DESCRIPTION

This invention comprises a dietary fiber supplement and method of making the supplement. The invention comprises 400 grade methylcellulose supplied in liquid dosage form in an amount in the range of from about 0.5 weight percent to about 1.7 weight percent. The supplement is available in liquid dosage form, as a beverage as well as a liquid concentrate.

The method of making the supplement is another aspect of the invention. The method of making the beverage and the liquid concentrate include dispersing a fiber source in water and maintaining the fiber in solution such that the supplement is supplied in liquid form to consumers. The method of making the beverage is a heating and cooling treatment while the method of making the concentrate is carried out at room temperature.

DETAILED DESCRIPTION OF THE INVENTION

It is an object of the current invention to provide a dietary fiber supplement supplied in liquid dosage form to consumers. The liquid dosage form of the supplement may be a beverage, or alternatively a liquid syrup concentrate. When the liquid dosage form is a beverage, the amount of methylcellulose therein is about 0.5 weight percent; the concentrate includes about 1.7 weight percent methylcellulose. Each serving of the fiber supplement provides about 0.5 weight percent of methylcellulose.

This invention provides the direct liquid form dietary fiber supplement product in two forms as a liquid concentrate to be diluted and as an individual serving size, packaged liquid product for immediate drinking. The two products are prepared by somewhat different processes.

One aspect of this invention provides a process for preparing a dietary fiber supplement aqueous liquid, water-dilutable concentrate composition containing about 1.0 to about 2.3 percent w/w of 400 grade methylcellulose fiber which involves mixing the 400 grade methylcellulose with a pharmaceutical or food grade of a high density liquid diluent such as high fructose corn syrup, olive oil, vegetable oil or glycerine, preferably high fructose corn syrup, in proportions of from about 1 to about 4 parts by volume of the liquid diluent to about 1 part by weight of the 400 grade methylcellulose, in an amount sufficient to provide the total composition being prepared with a concentration of about 1.0 to about 2.3 percent w/w of the 400 grade methylcellulose in the finished liquid concentrate volume, at a stirring rate of about 300 to 400 RPM for a time sufficient to obtain a substantially uniform mixture of the 400 grade methylcellulose with the liquid diluent. Usually, about 10 minutes is sufficient. Other additives such as flavoring materials, acidulants, heat, light and/or color stabilizer materials, either as such, or diluted with water can be added with stirring at essentially the same rate to this mixture of the 400 grade methylcellulose/liquid diluent mixture, before additional concentrate cold water is added. Usually a preservative, such as sodium benzoate can be added to the concentrate at this time in an amount to effectively sterilize the concentrate. Then, while continuing to stir the mixture at about 300 to 400 RPM, preferably at about 350±20 RPM, the resulting mixture is mixed and diluted with additional cold (about 40° to 50° F.) water in an amount and for a time sufficient to provide the resulting concentrate composition with a concentration such that, usually after packaging and shipping when the concentrate formulation is diluted with about 3 parts of water by volume per each volume part of the concentrate, the thus diluted concentrate will form a beverage form composition which will contain about 1.5 grams of the 400 methylcellulose fiber and about 0.45 to about 0.55 weight percent, e.g., about 0.485 percent weight/weight per 10 ounce serving of the resulting beverage strength composition.

Direct individual serving size packaged containers of the dietary fiber supplement of aqueous, beverage concentration can be prepared somewhat differently than how the concentrate is prepared. This invention provides a process for preparing individual serving size packages of the dietary fiber supplement liquid beverage composition which contains from about 0.45 to about 0.55 weight/volume percent of the 400 grade methylcellulose and in a sufficient individual serving volume size of the aqueous beverage composition to provide from about 1 to about 2 grams of said 400 grade methylcellulose fiber per 10 ounce liquid serving by mixing the 400 grade methylcellulose into a stirred high density liquid diluent as exemplified above, but preferably high fructose corn syrup in proportions of from about 1 to about 4 parts by volume of the high density liquid diluent per part of the 400 grade methylcellulose while agitating as by stirring in a vessel at a rate of about 300 to about 400 RPM while maintaining the temperature of the mixture at a cold liquid to room temperature for at time sufficient to form an essentially uniform mixture. Usually stirring for about 10 minutes is sufficient. Then, while continuing to maintain essentially the same stirring or agitation rate other desired additives such as flavoring, acidulant, preservatives, antioxidants and flavor or color stabilizer can be added either as such or first diluted with water until a uniform consistency of the mixture is obtained. Usually, stirring the mixture at this rate for up to 10 minutes for each additive is sufficient. Then, cold water is added in volume sufficient to dilute the mixture to provide the final composition with the desired beverage concentration of about 4.5 to 5.5 weight/volume percent in the beverage liquid batch.

Then, after any desired sample testing of the batch beverage composition, the bulk beverage composition is packaged into individual serving size containers, and pasteurized, e.g., either by known bulk flash heating in coiled pipes, or the like, treatment processes, but more commonly by passing the beverage containers through a heating line to heat the beverage contents to about 156°–158° F. for a time, usually about 10 to 15 minutes, sufficient to sterilize the beverage liquid contents in the containers. Thereafter, particularly if the beverage had been flash heated in bulk to pasteurize the product, the beverage liquid containers are cooled either in a refrigerator or a freezer for a time. In a refrigerator, the beverage packs should be cooled to at least 50° F. for about eight hours or in a freezer compartment for two to four hours. These process operations stabilize the beverage for shelf storage for up to about two years of product acceptable life.

The beverage is provided in a single serving container. The liquid concentrate is advantageous in that it furnishes multiple servings per container and decreases the amount of shelf space needed for storage. The liquid concentrate is diluted with water such that the amount of methylcellulose is about 0.5 weight percent per serving. The nonconcentrate beverage, after opening, should be consumed within about a 24 hour period.

The fiber supplement of the claimed invention overcomes the disadvantages of currently available fiber supplements by providing a soluble liquid fiber product directly to consumers. Presently available fiber supplement are only available as tablets and powders, which result in gritty, coarse mouthfeel. One embodiment of the instant invention is provided as a liquid concentrate requiring the addition of a liquid carrier. 400 grade methylcellulose provides a viscosity such that thickening does not result and is accompanied by an agreeable, pleasant taste.

The active or bulking agent of the supplement is methylcellulose having a 400 grade viscosity level. Methylcellulose is available from Shin-Etsu, Japan, and Dow Chemical Company, Midland, Mich. 400 grade methylcellulose is water soluble and results in a solution of low viscosity. Because the viscosity is reduced, the fiber supplement is a liquid, not a colloidal suspension. The 400 grade viscosity has been found to substantially reduce aftertaste and coarseness or "mouthfeel" of the fiber supplement, thus rendering a pleasant taste to the beverage.

The beverage contains methylcellulose in an amount in the range of from about 0.45 to 0.55 weight percent, preferably 0.485 weight percent, per serving. Further, the amount of methylcellulose must be sufficient to provide at least about one gram of fiber per ten ounce serving, preferably from one to four grams, more preferably two to four grams, most preferably 1.5 grams.

The dietary fiber supplement may also contain water, high fructose corn syrup, at least one antioxidant, at least one acidulant to adjust pH for pleasant mouthfeel, and a flavoring stabilizer. The concentrated liquid further contains a preservative such as sodium benzoate and the like. The antioxidant may be selected from the group consisting of ascorbic acid, BHA (butylated hydroxyanisole), BHT (butylated hydroxytoluene) and the like; the acidulant may be selected from the group consisting of citric acid and sodium citrate; and the flavoring stabilizer may be acacia, for example.

A natural flavoring additive may also be added to the fiber supplement and may be selected from the group consisting of lemon, lime, grapefruit, orange, tomato, pineapple, grape, peach, pear, cherry and the like. Orange flavoring provides a shelf life of at least about six months. Other flavoring additives include apple, cranberry, prune and the like which provide a shelf life of at least about two years.

The fiber supplement may also contain one or more of the following ingredients: orange juice concentrate, FD&C yellow #5, FD&C yellow #6. Each ten ounce serving contains about 140 calories and is low in sodium. A low calorie concentrate of the fiber supplement of the current invention contains only about one calorie per serving.

In addition to at least one gram of fiber, the fiber supplement of the present invention provides the following nutrition per serving (in grams) as set forth in Table 1:

TABLE 1

| protein | <1 |
| carbohydrate | 35 |
| fat | <1 |
| sodium | 0.1 |
| potassium | 0.14 |

Table 2 sets forth the percentages of U.S. recommended daily allowances of ingredients in the fiber supplement of the current invention.

TABLE 2

| vitamin C | 210% |
| thiamine | 2% |
| protein | <2% |
| vitamin A | <2% |
| riboflavin | <2% |
| niacin | <2% |
| calcium | <2% |
| iron | <2% |

The concentrated liquid dosage form of the fiber supplement is adapted to convert to the beverage form upon the addition of a sufficient amount of water to provide at least one gram of fiber per ten ounce serving, preferably from one to four grams, more preferably two to four grams, most preferably 1.5 grams. Preferably, the ratio of the first liquid syrup concentrate to water is 1:3, two ounces of concentrate to six ounces of water for example, in the resulting beverage form.

The method of making the liquid beverage dosage form of the instant fiber supplement is a "cold-hot-cold" process. High fructose corn syrup solution is placed, under agitation, in a tank at a temperature of less than or equal to room temperature. All of the following steps require agitation during the addition of the ingredients and for about ten minutes after each ingredient addition, unless otherwise noted. 400 grade methylcellulose is added to the high fructose corn syrup thus creating a high fructose corn syrup-methylcellulose, hereinafter HFCS-MC, solution. Cold water of a temperature of about 50° F. or less is added to the HFCS-MC solution. The antioxidants and acidulants are individually dissolved into the HFCS-MC solution. The natural flavors are then added.

The HFCS-MC solution is packaged into individual containers and tunnel pasteurized at about 156°-158° F. for a period of time in the range of 10-15 minutes to sterilize the solution and is immediately cooled to a temperature of about 50° F. by refrigeration, freezing or the like for example. The last cooling step takes approximately eight hours by refrigeration, or two to four hours by freezing.

The liquid concentrate dosage form is produced by a method which does not involve heat sterilization. The method of making the liquid concentrate is performed at less than or equal to room temperature. All of the following steps require agitation during the addition of the ingredients and for about ten minutes after each ingredient addition, unless otherwise noted. The 400 grade methylcellulose is displaced with stirring at 300 to 400 RPM, preferably at about 350±20 RPM for about in high fructose corn syrup solution, resulting in a high fructose corn syrup-methylcellulose, hereinafter HFCS-MC, solution. Antioxidants and acidulants are dissolved in water and then added to the HFCS-MC solution. Preservatives are dissolved in water and then added to the HFCS-MC solution. Alternatively, sodium citrate acidulant may be added to the HFCS-MC solution with the preservatives. The natural flavors are then added.

It has been found according to this invention that it is advantageous to agitate these mixtures using stirrer speeds approximating between about 300 to 400 RPM preferably about 350±20 RPM in standard pharmaceutical production size mixing tanks for about 10 minutes to obtain the best wetting and distribution of the methylcellulose 400 grade in the liquid mixture for long-term shelf stability storage. Lower speed stirring, say, at 50 to 200 RPM or hand mixing is unable to adequately disperse the 400 grade methylcellulose sufficiently to produce acceptable liquid product in terms of appearance, degree of cloudiness, tactility (feel) degree of oral grittiness property and amount of solid sediment or gel in the liquid product after packaging and standing. Similarly, extreme high speed mixing of the 400 grade methylcellulose/HFCS mixture stirred at high RPM speeds, e.g. on the order 2000 to 2300 RPM produce large volumes of foam and solid particles which separate from liquid medium which particles settle when the mixture is allowed to stand.

Higher viscosity grades of methylcellulose produce products which are found to be too viscous, provide an unacceptable degree of cloudiness, leave too much sediment or gel to provide acceptable liquid products.

It has been found according to this invention that the choice of 400 grade methylcellulose over lower or higher viscosity methylcellulose materials for these dietary fiber supplement compositions and the correct stirring rate provided a unique shelf-stable liquid beverage product that once cooled in preparation, the 400 grade methylcellulose/HFCS aqueous beverage product of this invention, upon reheating to ambient temperatures will remain stable for up to about 2 years, rather than form a gel or precipitate.

If desired, the aqueous liquid form 400 grade methylcellulose/HFCS products of this invention can also be mixed with food or pharmaceutical grade of ethyl alcohol in proportions up to about 50:50, by volume of the ethanol if desired, to accommodate inclusion of other alcohol soluble medicaments, taste materials or coloring agents (stabilizers, and the like) without affecting the stability of the 400 grade methylcellulose in the resulting dietary fiber compositions.

The following examples provide fiber supplements of the instant invention in liquid dosage form, beverage and concentrate, produced by the methods of the instant invention, but are not intended to and should not be construed as, placing an undue limitations on the invention as claimed.

Table 3 sets forth an example of a preparation of the fiber beverage of the claimed invention:

TABLE 3

| Ingredient | Amount |
|---|---|
| Beverage | |
| HFCS - 42 @ 71° | 99.06 gallons |
| Methocel A4C | 42.328 lbs. |
| Water | 866.06 gallons |
| Sodium citrate F.C.C. | 13.125 lbs. |
| Citric Acid, Anhydrous, F.C.C. | 24.75 lbs. |
| No. 404782 Naturally Flavored Orange Screwdriver Flavor | 37.5 gallons |
| Ascorbic Acid, F.C.C. | 0.84 lbs. |
| Total Finished Beverage | 1000 Gallons |

Finished Beverage Brix Value = 12.0
Methylcellulose 1.5 gram/10 fluid ounce serving
Legend: HFCS-42 = High Fructose corn syrup,
Methocel A4C = methylcellulose The high fructose corn syrup solution was placed in a tank with the mixer below the surface of the solution. The methylcellulose was added, creating a HFCS-MC solution after stirring the resulting mixture at about 350 RPM for about ten minutes of agitation. The antioxidant, ascorbic acid, was added, followed by the addition of water to form the concentrate together with or after the addition of the acidulants, citric acid and sodium citrate, and the natural orange flavoring under constant agitation of about 350 RPM. The HFCS - MC solution is packaged into individual containers and tunnel pasteurized at about 156°–158° F. for a period of time in the range of 10–15 minutes to sterilize the solution and is immediately cooled to a temperature of about 50° F. by refrigeration, freezing or the like for example. The last cooling step takes approximately eight hours by refrigeration, or two to four hours by freezing.

Table 4 sets forth an example of a preparation of the fiber supplement concentrate of the claimed invention:

TABLE 4

| Ingredient | Amount |
|---|---|
| 1-3 Concentrate | |
| HFCS-42 | 39.624 gallons |
| Methocel | 16.9312 lbs. |
| Water | 45.4166 gallons |
| Sodium citrate F.C.C. | 5.2498 lbs. |
| Citric Acid, Anhydrous, F.C.C. | 9.8999 lbs. |
| No. 404782 Orange Screwdriver | 15 gallons |
| Ascorbic Acid, F.C.C. | 0.3386 lbs. |
| Sodium Benzoate, F.C.C. | 0.4949 lbs. |

| Yield | 100 Gallons |
|---|---|
| Solids | |
| HFCS-42 | 315.8825 lbs. |
| Methocel | 16.9312 lbs. |
| Sodium Citrate, F.C.C. | 3.2498 lbs. |

TABLE 4-continued

| Ingredient | Amount |
|---|---|
| Citric Acid | 9.8999 lbs. |
| #404782 | 70.4769 lbs. |
| Ascorbic Acid | 0.3386 lbs. |
| Sodium Benzoate | 0.4949 lbs. |
| | 419.2738 |

Brix value of concentrate = 42.4
Diluted (1:3) Brix value = 12.0
Sodium Benzoate Content of Concentrate = 1/20 of 1%

Methylcellulose was added to the high fructose corn syrup at room temperature under agitation at about 350 RPM for about 10 minutes. The antioxidant ascorbic acid and acidulants sodium citrate and citric acid were added, followed by the addition of sodium benzoate and the orange screwdriver flavoring.

A more up-to-date example of a formulation recipe to make a concentrate composition of this invention.

TABLE 5

| HFCS | 50.572 gallons |
|---|---|
| Methocel AYC Premium | 16.9312 lbs. |
| Water | 44.428 gallons |
| Citric Acid, Anhydrous, F.C.C. | 7.936 lbs. |
| Sodium Benzoate, F.C.C. | 0.495 lbs. |
| Flavoring Material (orange screwdriver) | 5.000 gallons |
| YIELD | 100.000 gallons |
| SOLID | |
| HFCS-42 | 403.1599 lbs |
| Methocel | 16.9312 lbs. |
| Citric Acid | 7.9360 lbs. |
| Sodium Benzoate | 0.4950 lbs. |
| TOTAL | 428.5221 lbs. |

BRIX = 42.06°
DILUTRO 1 + 3 = 4 = 12.01°
SODIUM BENZOATE CONTENT OF CONCENTRATE = 1/20 of 1%

In use, it is contemplated that this concentrate composition would be diluted with water in proportion of 1 part of the concentrate to 3 parts of water by volume. This concentrate has no ascorbic acid.

The following table presents and compares the gram amounts and percent by weight of 400 grade methylcellulose (Methocel ® brand) in grams of 400 grade methylcellulose per 10 oz. serving of the beverage strength liquid supplement (concentrate percentage of 400 grade methylcellulose shown before and after dilution of concentrate with water in proportions of 1 part by volume of concentrate with 3 parts by volume of water), and the percent by weight of the 400 grade methylcellulose in the desired diluted beverage product from either the concentrate or beverage product.

| | 400 Grade Methylcellulose (Methocel ® Brand) Content | | |
|---|---|---|---|
| Product Type | Methocel Content per 10 fl. oz Serv. | Methocel w/w in Concentrate | Methocel % w/w in Finished Beverage |
| Concentrate | 1.0 | 1.14% | 0.3235% |
| Concentrate | 1.5 | 1.71% | 0.485% |
| Concentrate | 2.0 | 2.28% | 0.64707% |
| Beverage | 1.0 | | 0.325% |
| Beverage | 1.5 | | 0.485% |
| Beverage | 2.0 | | 0.64707% |

1 gallon of 1:3 ratio concentrate syrup = 9.9 lbs/gallon
1 gallon of 12.0° Brix finished beverage = 8.722 lbs/gallon Presently, we are using the orange screwdriver natural flavoring but we contemplate that the flavor may be changed to partially or full synthetic orange or other flavoring as our experience and taste preferences of users of these compositions are changed.

The fiber supplement of the current invention increase the volume of the intestinal contents by a number of mechanisms. The fiber supplement adds bulk, and thus differs from laxatives, because it is not digested and because methylcellulose holds water, swelling upon the absorption of water. It also increases bacterial mass due to fermentation and exert mechanical effects by way of increased peristalsis (intestinal movement or churning).

As such, the fiber supplement of the current invention is useful as a first line of therapy for hemorrhoids. The claimed supplement increases fiber in diet aids thus aid in the management of irritable bowel syndrome and diverticulosis. It is also helpful to children and adults who need help in naturally regulating their bowel habits from constipation and diarrhea. The fiber supplement may also confer protection from hiatal hernia formation and colon cancer and breast cancer.

While this invention has been disclosed with reference to a specific embodiment, it is apparent that other embodiments and equivalent variations of this invention may be devised by those skilled in the art without departing from the true spirit and scope of this invention. The appended claims are intended to be construed to include all such embodiments and equivalent variations.

What is claimed:

1. A process for preparing a dietary fiber supplement aqueous liquid, water-dilutable, concentrate composition containing about 1.0 to about 2.3 percent w/v of 400 grade methylcellulose fiber which comprises, (a) mixing said 400 grade methylcellulose with a high density liquid diluent in proportions ranging from about 1 to 4 parts, by volume, of said high density liquid diluent to one part by weight of said 400 grade methylcellulose sufficient to provide said 1.0 to 2.3 percent w/w concentration in the finished concentrate volume at a stirring rate of about 300 to 400 RPM for a time sufficient to obtain a substantially uniform mixture of said 400 grade methylcellulose and said high density liquid diluent, (b) mixing water with the mixture from step (a) while stirring the mixture at a rate of about 300 to 400 RPM in an amount of water and for a time sufficient to provide the resulting composition with a concentrated formulation having long-term shelf stability storage properties, which concentrate formulation, when diluted with about 3 parts of water per part of concentrate by volume will provide a beverage composition containing about 1 to 2 grams of the 400 grade methylcellulose and about 0.45 to about 0.55 of weight percent per 10 ounce serving of said resulting beverage strength composition.

2. A process according to claim 1 wherein the high density liquid diluent is selected from the group consisting of high fructose corn syrup, olive oil, vegetable oil and glycerine.

3. A process according to claim 2 wherein the high density liquid diluent is high fructose corn syrup (HFCS).

4. A process according to claim 3 wherein in step (a) the mixture containing the 400 grade methylcellulose and the high fructose corn syrup diluent is stirred at a rate of about 350±10 RPM for about 10 minutes before that mixture is diluted with water to form the concentrate composition.

5. A process according to claim 4 where in step (a) the methylcellulose 400 and high fructose corn syrup (HFCS) are mixed in proportions equivalent to about 163.0 gm of the methylcellulose 400 to about 108 fluid ounces of HFCS.

6. A concentrate composition prepared by the process of claim 5.

7. A concentrate composition prepared by the process of claim 4.

8. A concentrate composition prepared by the process of claim 3.

9. A process according to claim 1 wherein the step (a) at least one additive selected from the group consisting of an antioxidant, a preservative, an acidulant, a flavoring agent and a stabilizer is added to the mixture of the 400 grade methylcellulose and the high density liquid diluent water.

10. A concentrate composition prepared by the process of claim 9.

11. A concentrate composition prepared by the process of claim 1.

12. A process for preparing individual, packaged serving of a dietary fiber supplement in aqueous beverage concentration containing from about 0.45 to about 0.55 weight percent of 400 grade methylcellulose, and in a sufficient individual serving volume of aqueous mixture to provide from about 1 gram to about 2 grams of said 400 grade methylcellulose fiber per ten ounce serving, which comprises, mixing the 400 grade methylcellulose into a high density liquid diluent in proportion of from about 1 to 4 parts by volume of the high density liquid diluent selected from the group consisting of high fructose corn syrup, olive oil, vegetable oil and glycerine by volume to one part by weight of said 400 grade methylcellulose, while agitating this mixture as by stirring in a vessel at a rate of from about 300 to 400 RPM while maintaining the temperature of the mixture at a cold liquid to room temperature for a time sufficient to form an essentially uniform mixture, then, while continuing to maintain essentially the same agitation rate of stirring, adding other desired additives selected from the group consisting of flavoring, acidulant, preservatives antioxidant, and any flavor or color stabilizer while stirring the mixture at 300 to 400 RPM for a time sufficient to ensure uniform mixing after addition of each additive, adding water in amount sufficient to form the beverage concentration in the resulting liquid mixture, packaging the above beverage mixture into individual serving package containers, pasteurizing the beverage filled individual containers to sterilize the beverage contents in the packaged containers, and then cooling the resulting sterilized beverage packaged containers to a temperature at least as low as 50° C. by refrigeration for about 8 hours, or by putting the packaged beverage containers in a freezer atmosphere for about two to four hours, to provide a product having long-term shelf stability properties.

13. A process according to claim 12 wherein the high density liquid diluent is high fructose corn syrup.

14. A packaged, individual size product produced by the process of claim 13.

15. A packaged, individual serving size product produced by the process of claim 12.

* * * * *